US009768592B2

(12) United States Patent
Unger et al.

(10) Patent No.: US 9,768,592 B2
(45) Date of Patent: Sep. 19, 2017

(54) UTILITY ENCLOSURE PEDESTAL

(71) Applicant: Hubbell Incorporated, Shelton, CT (US)

(72) Inventors: John Joseph Unger, Rocky Mount, NC (US); Ryan Hudlow, Rocky Mount, NC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/237,421

(22) Filed: Aug. 15, 2016

(65) Prior Publication Data

US 2017/0054277 A1 Feb. 23, 2017

Related U.S. Application Data

(60) Provisional application No. 62/207,050, filed on Aug. 19, 2015.

(51) Int. Cl.
*H02G 3/08* (2006.01)
*H02B 1/50* (2006.01)
(Continued)

(52) U.S. Cl.
CPC ............... *H02B 1/50* (2013.01); *H02B 1/28* (2013.01); *H02B 1/48* (2013.01)

(58) Field of Classification Search
CPC .. H02G 3/08; H02G 3/14; H02G 3/16; H02G 3/18; H02B 1/50; H02B 1/28; H02B 1/48; H02B 1/26; H02B 1/30
USPC ........ 174/50, 37, 60, 53, 57, 58, 54, 38, 39; 220/3.2, 3.3, 3.8, 4.02, 484; 248/906; 312/351.2, 351.1; 361/600, 601, 641, 361/659, 679, 724, 730, 796; 385/134, 385/135
See application file for complete search history.

(56) References Cited

U.S. PATENT DOCUMENTS

| 229,857 A | 7/1880 | Brainerd |
| 589,780 A | 9/1897 | Howard |

(Continued)

FOREIGN PATENT DOCUMENTS

| CA | 1113383 | 12/1981 |
| CN | 200979974 Y | 11/2007 |

(Continued)

OTHER PUBLICATIONS

1. Carson Industries, Inc. Brochure; Poly Vault Series, Model 2436 (2 pages), Jan. 1, 1998.

(Continued)

*Primary Examiner* — Angel R Estrada
(74) *Attorney, Agent, or Firm* — Wissing Miller LLP

(57) ABSTRACT

A pedestal enclosure base includes a top surface, a first tier for receiving a first sized pedestal cover, a second tier for receiving a second sized pedestal cover, and a lower ledge that can rest on a utility box cover. A pedestal enclosure assembly includes a pedestal enclosure base configured for receiving a plurality of different sized pedestal covers and a utility adapter, attachable to the pedestal base in a plurality of different configurations. A utility enclosure assembly includes a utility box having a utility cover, a pedestal base attachable to the utility cover and one of a plurality of different sized pedestal covers attachable to the pedestal base.

24 Claims, 4 Drawing Sheets

(51) Int. Cl.
*H02B 1/48* (2006.01)
*H02B 1/28* (2006.01)

(56) References Cited

U.S. PATENT DOCUMENTS

| | | |
|---|---|---|
| 673,957 A | 5/1901 | Lang |
| 1,139,188 A | 5/1915 | Kane |
| 1,163,397 A | 12/1915 | Ford |
| 1,170,094 A | 2/1916 | Neff |
| 1,203,885 A | 11/1916 | Lombard |
| 1,270,236 A | 6/1918 | Eckfeldt |
| 1,342,563 A | 6/1920 | More |
| 1,433,430 A | 10/1920 | Taylor |
| 1,604,330 A | 10/1926 | Witkowski |
| 1,684,983 A | 9/1928 | Clark |
| 1,878,544 A | 9/1932 | Schmidt |
| 2,034,472 A | 3/1936 | Kesslinger |
| 2,317,450 A | 4/1943 | Folds et al. |
| 2,330,306 A | 9/1943 | Murphy |
| 2,420,478 A | 5/1947 | Hasselhorn et al. |
| 2,883,853 A | 4/1959 | Forni |
| 2,916,539 A | 12/1959 | Hamilton |
| 3,538,236 A | 11/1970 | Baumgartner |
| 3,618,275 A | 11/1971 | Ance |
| 3,672,103 A | 6/1972 | Kost |
| 3,717,963 A | 2/1973 | Sauriol |
| 3,858,755 A | 1/1975 | Tellen |
| 3,906,295 A | 9/1975 | Tessmer |
| 3,921,449 A | 11/1975 | Hauffe et al. |
| 3,929,360 A | 12/1975 | Gulistan |
| 3,952,908 A | 4/1976 | Carson |
| 3,974,599 A | 8/1976 | Grosh |
| 3,985,258 A | 10/1976 | Quigley |
| 4,065,020 A | 12/1977 | Carson |
| 4,153,176 A | 5/1979 | Carson |
| 4,158,102 A | 6/1979 | Bright |
| 4,163,503 A | 8/1979 | McKinnon |
| 4,186,952 A | 2/1980 | Glass |
| D257,133 S | 9/1980 | McKinnon |
| 4,230,234 A | 10/1980 | Taylor |
| 4,365,108 A | 12/1982 | Bright |
| 4,443,654 A | 4/1984 | Flachbarth et al. |
| 4,863,059 A | 9/1989 | Christensen |
| 4,864,467 A | 9/1989 | Byrd et al. |
| 4,892,978 A | 1/1990 | Axworthy |
| 5,111,000 A | 5/1992 | Maraldo |
| 5,210,374 A | 5/1993 | Channell |
| 5,401,902 A | 3/1995 | Middlebrook |
| 5,627,340 A | 5/1997 | Smith et al. |
| 5,791,098 A | 8/1998 | Thomas |
| 5,911,117 A | 6/1999 | Bhame et al. |
| 5,996,612 A | 12/1999 | Crawford |
| 6,008,452 A | 12/1999 | Lux, Jr. |
| 6,014,490 A | 1/2000 | Canning et al. |
| 6,061,983 A | 5/2000 | McCleskey |
| 6,073,792 A | 6/2000 | Campbell |
| 6,182,846 B1 | 2/2001 | Leschinger et al. |
| 6,266,233 B1 | 7/2001 | O'Regan |
| 6,321,928 B1 | 11/2001 | Goldenstein et al. |
| 6,357,804 B1 | 3/2002 | Bernier et al. |
| 6,362,419 B1 | 3/2002 | Gallagher et al. |
| 6,411,767 B1 | 6/2002 | Burrous et al. |
| 6,455,772 B1 | 9/2002 | Leschinger et al. |
| 6,568,226 B1 | 5/2003 | Ramsauer |
| 6,598,949 B2 | 7/2003 | Frazier et al. |
| 6,667,437 B2 | 12/2003 | Schenk |
| 6,676,176 B1 | 1/2004 | Quandt |
| 6,698,853 B2 | 3/2004 | Chen et al. |
| 6,851,567 B2 | 2/2005 | McKinnon |
| 6,881,898 B2 | 4/2005 | Baker et al. |
| 6,899,240 B2 | 5/2005 | Dang et al. |
| 6,953,209 B2 | 10/2005 | Jackson et al. |
| 6,968,969 B1 | 11/2005 | McKinnon et al. |
| D517,011 S | 3/2006 | Burke |
| 7,030,315 B1 | 4/2006 | Dunn |
| 7,038,127 B2 | 5/2006 | Harwood |
| 7,193,151 B2 | 3/2007 | Harwood |
| 7,330,625 B2 | 2/2008 | Barth |
| 7,381,888 B2 | 6/2008 | Burke et al. |
| 7,385,137 B2 | 6/2008 | Burke et al. |
| 7,547,051 B2 | 6/2009 | Burke et al. |
| 8,249,411 B2 * | 8/2012 | Burke ............... G02B 6/4442 |
| | | 385/135 |
| 8,497,424 B2 | 7/2013 | Castaldo |
| 8,847,070 B2 | 9/2014 | Burke |
| 2005/0067180 A1 | 3/2005 | Dinh |
| 2005/0103780 A1 | 5/2005 | Maloney et al. |
| 2005/0189133 A1 | 9/2005 | Harwood |
| 2005/0275319 A1 | 12/2005 | Wittmeier et al. |
| 2006/0090917 A1 | 5/2006 | Lowe et al. |
| 2006/0217007 A1 | 9/2006 | Stachowiak, Jr. |
| 2006/0254794 A1 | 11/2006 | Burke |
| 2014/0020925 A1 | 1/2014 | Seff et al. |

FOREIGN PATENT DOCUMENTS

| | | |
|---|---|---|
| DE | 7034179 | 12/1970 |
| EP | 0641897 A1 | 3/1995 |
| EP | 1245738 | 10/2002 |
| EP | 1467454 | 10/2004 |
| FR | 2330177 | 5/1977 |
| GB | 1503056 | 3/1978 |
| GB | 2264394 | 8/1993 |
| IE | 20010318 | 10/2002 |
| JP | 2006006020 | 1/2006 |
| WO | 9401907 | 1/1994 |

OTHER PUBLICATIONS

Carson Industries, Inc. Brochure; Grade-Level Enclosures (4 pages), undated.

International Search Report dated Jul. 18, 2006, for corresponding PCT/US2006/008605, in the name of Channell Commercial Corporation.

International Search Report and Written Opinion mailed in corresponding PCT/US16/47088 on Oct. 28, 2016.

* cited by examiner

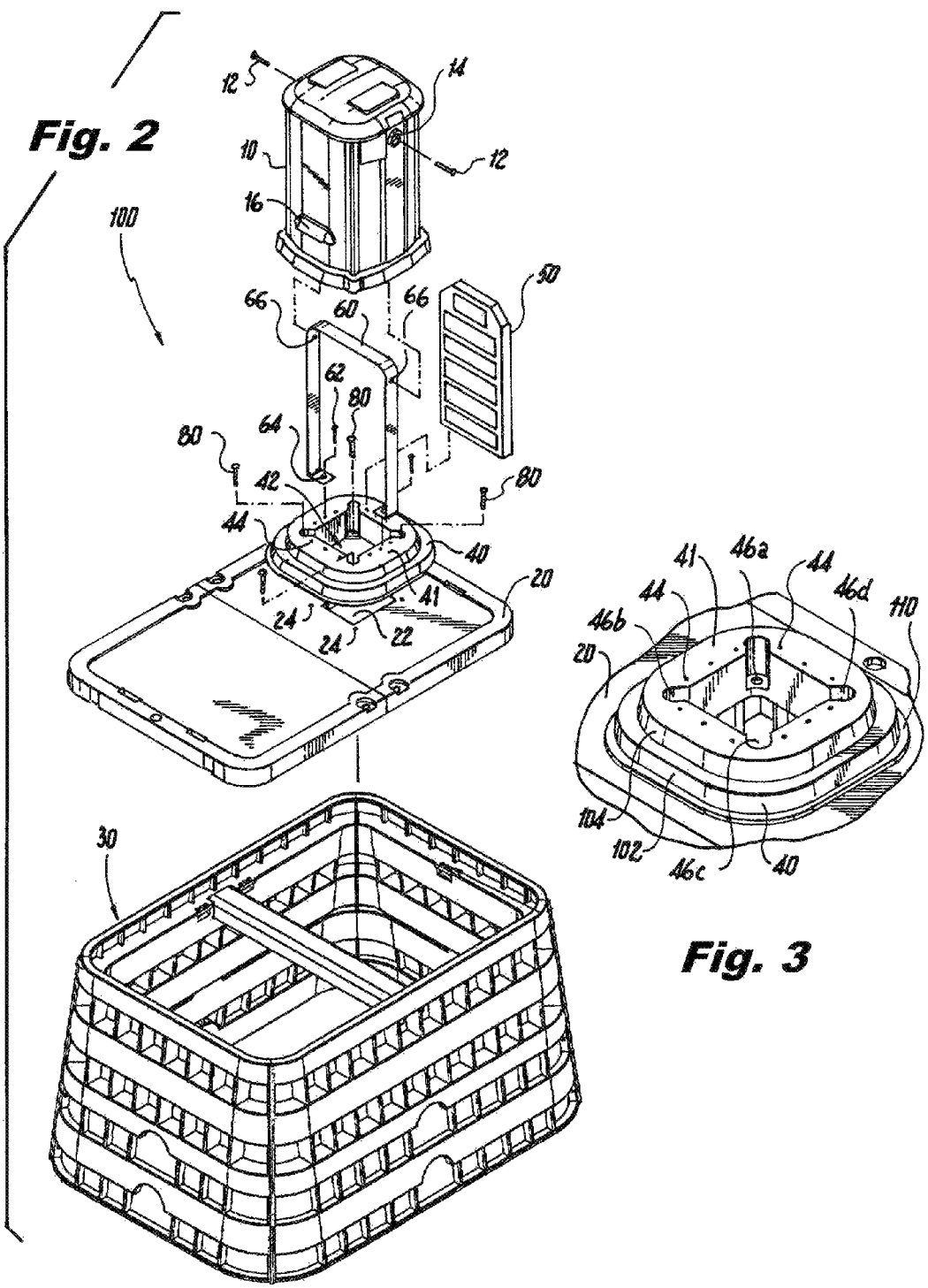

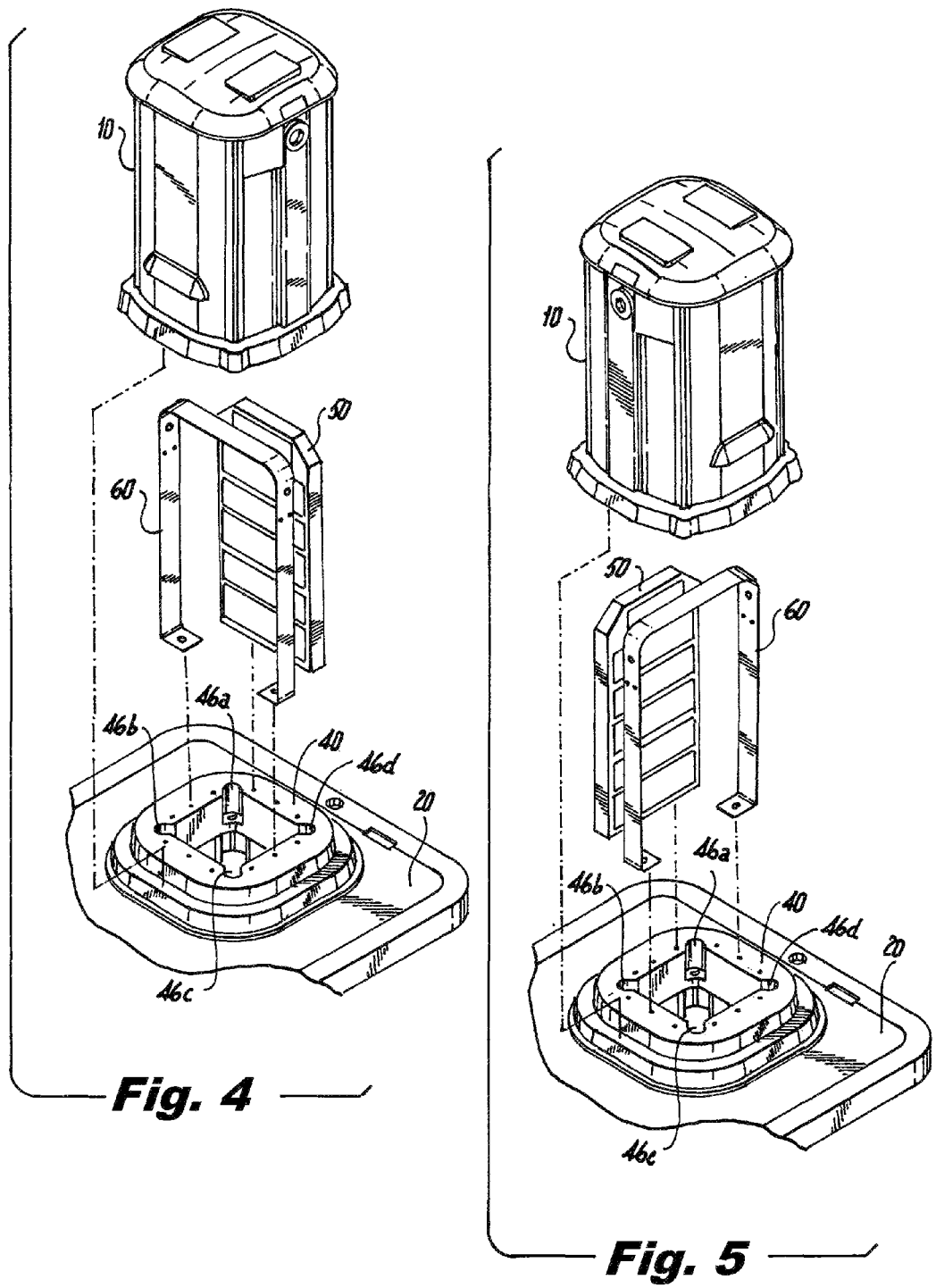

UTILITY ENCLOSURE PEDESTAL

CROSS REFERENCE TO RELATED APPLICATIONS

The present disclosure is based on and claims benefit from U.S. Provisional Application Ser. No. 62/207,050 filed Aug. 19, 2015 entitled "Utility Enclosure Pedestal," the entire contents of which are herein incorporated by reference.

BACKGROUND

Field

The present disclosure relates to utility enclosures and, more particularly, to utility enclosure pedestals.

Description of the Related Art

Utility companies such as water, electric, communication and/or gas utilities often use subterranean passages or tunnels as conduits. For example, cable companies may run underground cables through buried utility boxes having covers at grade for workman access. The utility box often functions as a junction box and may have one or more junctions including taps and/or splitters, where cables can be tapped, split, reworked, etc. as desired. In order to provide ease of access to the cables and to keep the junctions above grade in a relatively dry environment, the utility box may include one or more pedestal enclosures extending above grade from the cover of the main utility box. In order to provide a water resistant seal, the base of the pedestal enclosure is generally permanently mounted to the cover of the main box by rivets, weld, glue, etc. The pedestal enclosure may include an adaptor panel such as a connection panel or patch panel permanently mounted to the pedestal base. Cables run up into the pedestal enclosure through one or more holes or passages provided in the cover of the utility box below the pedestal enclosure. The cables may then be joined at the adapter panel. In order to provide access to the adaptor panel, the pedestal enclosure includes a pedestal cover removably attached to the base of the pedestal enclosure. The pedestal enclosure thus provides ease of access to the cables and junctions and allows the junctions to be maintained above grade in a relatively dry environment.

Utility boxes may be installed in discrete locations and are often provided in locations having vegetation including shrubbery, trees, etc. in order to hide the pedestal enclosure. Over time, as more and more cables are added, the communication system may outgrow the size of the adapter panel and/or pedestal enclosure. At the same time, the vegetation may grow making it difficult to access the contents of the pedestal enclosure in the position it was originally installed. Present pedestal enclosures provide little or no flexibility for dealing with these issues.

SUMMARY

The present disclosure provides embodiments of pedestal enclosure assemblies, utility enclosure assemblies and pedestal enclosure bases. In one exemplary embodiment, the pedestal enclosure assembly includes a base configured for receiving a plurality of different sized covers and a utility adapter attachable to the base in a plurality of different configurations. In another exemplary embodiment, the pedestal enclosure assembly includes a base, a utility adapter and a bracket. The base includes a top surface, a first tier for receiving a first sized pedestal cover, a second tier for receiving a second sized pedestal cover, and a lower ledge that can rest on a utility box cover. The utility adapter is removably attachable to the top surface of the base in a plurality of different configurations. The bracket is removably attachable to the top surface of the base in a plurality of different configurations. And, the top surface of the base has a plurality of holes for mounting the utility adapter and the bracket.

In one exemplary embodiment, the utility enclosure assembly includes a utility box, a pedestal base and a pedestal cover. The utility box has a utility cover, and the utility cover has a cutout. The pedestal base is attachable to the utility cover and has a central opening so that when the pedestal base is attached to the utility cover the central opening aligns with the cutout. The pedestal base is configured to receive a plurality of different sized pedestal covers. The pedestal cover includes one of a plurality of different sized covers that are attachable to the pedestal base.

In one exemplary embodiment, the pedestal enclosure base includes a first stepped surface for receiving a first sized pedestal cover and a second stepped surface for receiving a second sized pedestal cover. In another exemplary embodiment, the pedestal enclosure base includes a top surface, a first tier for receiving a first sized pedestal cover, a second tier for receiving a second sized pedestal cover, and a lower ledge that can rest on a utility box cover. The top surface of the base has a plurality of holes for mounting a utility adapter and a bracket.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 2 is an exploded view of a utility box including a representative pedestal enclosure according to an illustrative embodiment of the present disclosure;

FIG. 3 is a perspective view of a pedestal enclosure base according to an illustrative embodiment of the present disclosure;

FIG. 4 is an exploded view of a pedestal enclosure according to an illustrative embodiment of the present disclosure in a first configuration;

FIG. 5 is an exploded view of a pedestal enclosure according to an illustrative embodiment of the present disclosure in a second configuration.

DETAILED DESCRIPTION

Illustrative embodiments of the present disclosure may be provided as improvements to various types of utility enclosures. For example, a configurable pedestal enclosure according to an embodiment of the present disclosure may be provided on and attached to a utility enclosure cover.

Illustrative embodiments of the present disclosure provide systems and methods for pedestal enclosures that are readily user configurable. According to an embodiment of the present disclosure, a base of a pedestal enclosure system is designed to accept multiple sized covers. In addition, the pedestal enclosure may include an adapter and pedestal cover frame mount that are readily user configurable.

According to an embodiment of the present disclosure, a user configurable pedestal enclosure is provided to be used with a utility enclosure. The configurable pedestal enclosure includes a base that is mounted to the cover of the utility enclosure. The base includes tiered step-like features that allow different sized pedestal covers to be utilized. The base is designed to accept an adapter panel and to allow the user to configure the adapter panel in a number of positions as convenient.

In certain illustrative embodiments described herein, the utility enclosure and the pedestal enclosure are constructed from plastic such as high density polyethylene (HDPE). Alternatively, illustrative embodiments may use polymer concrete for the utility enclosure and/or pedestal enclosure or for one or more portions thereof. In the illustrative embodiments described herein, one more components of the pedestal enclosure may be made from a material such as stainless steel, galvanized steel and spring steel as appropriate. Alternatively, steel, brass, aluminum or other appropriate alloy may be used for the appropriate components. Of course, other types of materials such as plastics, composites, etc. may be used as desired and where appropriate.

In certain embodiments of the present disclosure, a pedestal base is mounted to a utility cover. The pedestal base includes a plurality of different sized tiers or steps allowing different sized pedestal covers to be utilized. The pedestal base also includes multiple mounting areas for mounting a bracket used for securing the pedestal cover to the pedestal base and/or for mounting a utility adapter. In this way, the pedestal enclosure can be configured by the end user as desired.

Figure 1:
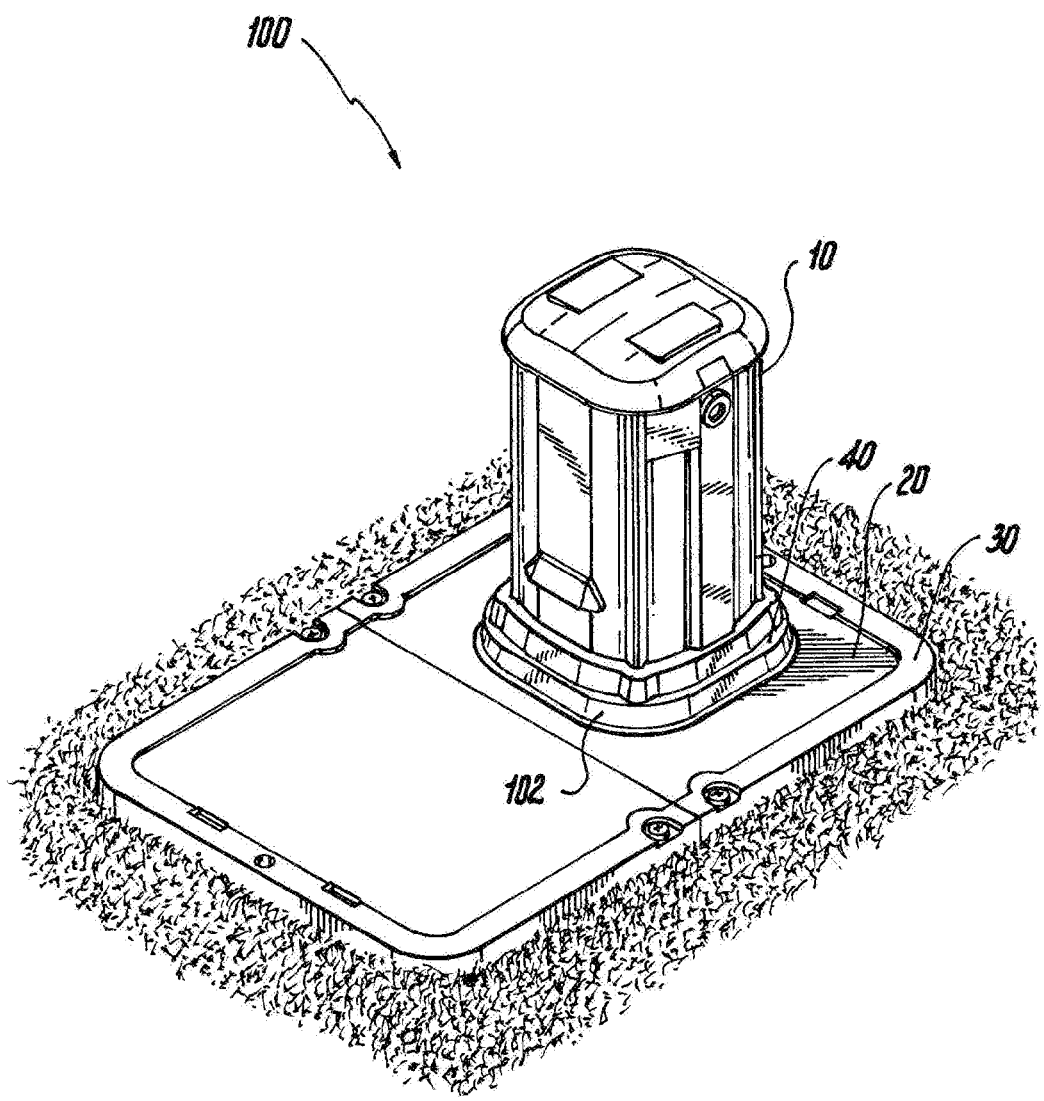
FIG. 1 is a top, side perspective view of a representative pedestal enclosure according to an illustrative embodiment of the present disclosure.

A representative pedestal enclosure according to an embodiment of the present disclosure is shown in FIG. 1 and is referred to generally as pedestal enclosure 100. According to this embodiment of the present disclosure, pedestal enclosure 100 includes a pedestal base 40 and a pedestal cover 10. Pedestal base 40 is mounted to utility enclosure cover 20. For example, pedestal base 40 may be mounted to utility enclosure cover 20 utilizing screws, nuts and bolts, rivets, plastic weld, etc. Alternatively, pedestal base 40 may be formed in situ during manufacture of utility cover 20. Generally, pedestal base 40 forms a water resistant seal with utility cover 20. The utility cover 20 has one or more holes formed beneath the pedestal base 40 so that utility wires, cables, etc. can be brought up into the pedestal enclosure 100. The utility cover 20 fits snugly within utility box 30 which is situated at grade as shown.

Embodiments of the present disclosure are shown herein with respect to a certain size/shape pedestal enclosure being mounted to a certain size/shape utility enclosure. However, it will be appreciated that the utility enclosure and the pedestal enclosure each may take any shape and size as suitable for a particular application.

A utility enclosure includes a utility box 30 and a utility cover 20 as shown in FIG. 2. A pedestal enclosure according to an embodiment of the present disclosure is mounted to the utility cover 20 and includes a pedestal base 40, pedestal cover 10, utility adapter panel 50 and U-shaped bracket 60. Utility cover 20 has a utility hole cutout 22 that may be similarly dimensioned to a hole 42 in pedestal base 40. Utility cover 20 also includes one or more holes 24 positioned to align with one or more holes 46 (see FIG. 3) in pedestal base 40. Holes 24 and/or holes 46 may or may not be threaded such that pedestal base 40 can be secured to utility cover 20 with screws and/or rivets 80. In addition or alternatively, pedestal base 40 may be plastic welded, glued, etc. to utility cover 20 to provide a water resistant seal.

U-shaped bracket 60 includes mounting holes 64. U-shaped bracket 60 is mounted to pedestal base 40 utilizing screws 62 which screw into holes 44 in pedestal base 40. Utility adapter 50 may also be attached to pedestal base 40 using one or more screws (not shown) which are screwed into one or more holes 44 in pedestal base 40. Pedestal cover 10 is dimensioned such that the inner side walls of pedestal cover 10 fit snugly over U-shaped bracket 60 and includes holes 14 positioned to correspond to threaded screw holes 66 in U-shaped bracket 60. One or more screws 12 slip through holes 14 and are screwed into threaded screw holes 66. Pedestal cover 10 may include one or more vents 16, as shown, which may also be used as handles. The U-shaped bracket 60 may be made of aluminum, for example, to provide strength to the utility pedestal and to provide a sturdy framework for hanging communications equipment and/or cables. U-shaped bracket 60 may also provide for locking options allowing the pedestal cover 10 to be locked in the closed position.

A more detailed view of pedestal base 40 is shown in FIG. 3. Pedestal base 40 includes a lower ledge 110 that rests on and is mounted to utility cover 20 utilizing screws and/or rivets using one or more holes 46a-46d so that the pedestal base is sealed to the utility cover. A sealing member, such as a rubber or foam gasket (not shown), may be positioned between the lower ledge 110 and the utility cover 20 to better seal the junction between the lower ledge and the utility cover. In the embodiment shown, the pedestal base 40 is secured to the utility cover 20 using two screws 80; one in hole 46a and one in hole 46c seen in FIG. 2. In order to accept multiple size pedestal covers, pedestal base 40 includes at least two tiered step-like features 102, 104. Upper tier 104 is dimensioned for receiving a first size pedestal cover and lower tier 102 is dimensioned for receiving a second, larger sized pedestal cover. Of course, pedestal base 40 may include additional differently dimensioned tiers for receiving additional different sized pedestal covers as desired.

The top 41 of the pedestal base 40 includes four sets of three holes 44 each. Each hole 44 is threaded for receiving a similarly dimensioned screw. The four sets of holes allow the U-shaped bracket 60 and utility adapter 50 to be mounted in various positions as desired by the end user to ensure the user has the easiest access to utility adapter 50. In the embodiment shown, to align the U-shaped bracket 60 to the center of the pedestal base 40, the center holes in the sets of holes 44 are preferably used to mount the U-shaped bracket 60 to the pedestal base 40.

Referring to FIG. 4, the pedestal base 40 is shown mounted to utility cover 20. As noted above, pedestal base 40 may be screwed, riveted and/or plastic welded, glued, etc. to utility cover 20 to provide a water resistant seal. Pedestal base 40 has symmetry as shown. Accordingly, utility adapter 50, U-shaped bracket 60 and pedestal cover 10 can be configured in a number of different ways on pedestal base 40. For example, as shown in FIG. 4, utility adapter 50 and U-shaped bracket 60 are mounted to pedestal base 40 in one configuration.

If for some reason in the configuration shown in FIG. 4 it becomes difficult for the user to access the utility adapter 50, the pedestal base 40 can be detached from the utility cover 20 by unscrewing screws 62, and the pedestal base can be rotated a desired angular distance, e.g., rotated 90 degrees. The pedestal base 40 is then reattached to the utility cover 20 using screws 62 through, for example, the holes 44. To illustrate and referring to FIG. 5, the screws 62 holding utility adapter 50 and U-shaped bracket 60 to pedestal base 40 can be removed and utility adapter 50 and U-shaped bracket 60 can be repositioned by for example rotating the utility adapter 50 and U-shaped bracket 60 90 degrees. Utilizing the square pedestal shape shown in the figures, there are effectively 4 different configurations possible. That is, the utility adapter 50 can be mounted to any side of the square pedestal base in any of four positions: 12 o'clock, 3 o'clock, 6 o'clock or 9 o'clock. Of course, other shaped pedestals may be used. For example, an octagon shaped pedestal may be used in which case there would be 8 different configurations possible.

Figure 6:
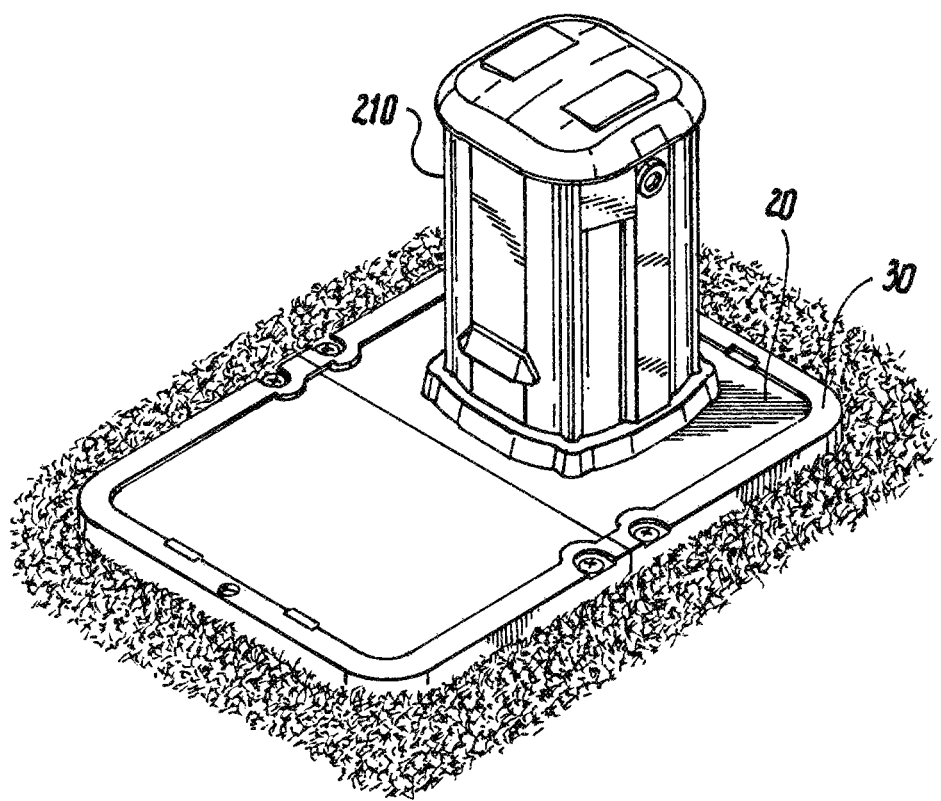
FIG. 6 is a perspective view of a pedestal enclosure according to an illustrative embodiment of the present disclosure.

Sometimes, the utility wires and cables within the pedestal enclosure may outgrow the size of the pedestal box. In this case, it would be beneficial if the pedestal enclosure could be replaced with a larger pedestal enclosure. Heretofore, the entire pedestal base would need to be removed and replaced with a larger pedestal base. As described above, the pedestal base is often permanently attached to the utility cover by plastic weld, glue, etc. Accordingly, replacing the pedestal base is not practical. According to embodiments of the present disclosure, since the pedestal base 40 has the tiered step-like structure, different sized pedestal covers may be used. For example, the pedestal cover 10 depicted in FIG. 1 is dimensioned to fit on the top tier of pedestal base 40 (e.g., see tier 104, FIG. 3). If more area is desired in the pedestal cover, pedestal cover 10 may be replaced with the larger sized pedestal cover 210 shown in FIG. 6. Pedestal cover 210 is dimensioned to fit over tier 102 (see FIG. 3).

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A pedestal enclosure assembly comprising:
a multi-tiered base configured to receive a plurality of pedestal covers, wherein each of the tiers is configured to receive a different size pedestal cover; and
a utility adapter attachable to an upper surface of the uppermost tier such that the utility adapter can be attached to the uppermost tier in a plurality of different configurations.

2. The pedestal enclosure assembly of claim 1, wherein the multi-tiered base is mountable to a utility enclosure cover.

3. The pedestal enclosure assembly of claim 1, wherein the multi-tiered base comprises a first tier and a second tier, wherein each tier is configured to receive one of the plurality of different sized pedestal covers.

4. The pedestal enclosure assembly of claim 1, wherein the multi-tiered base is substantially square and the plurality of different configurations comprises four different configurations.

5. The pedestal enclosure assembly of claim 1, further comprising a bracket removably attached to the upper surface of the uppermost tier, wherein the plurality of different sized pedestal covers are removably attachable to the bracket.

6. The pedestal enclosure assembly of claim 5, wherein the bracket is attachable to the upper surface of the uppermost tier in a plurality of different configurations.

7. A pedestal enclosure assembly comprising:
a pedestal base having:
a top surface;
a first tier for receiving a first sized pedestal cover;
a second tier for receiving a second sized pedestal cover; and
a lower ledge that can rest on a utility box cover;
a utility adapter attachable to the top surface of the pedestal base in a plurality of different configurations;
a bracket removably attachable to the top surface of the pedestal base in a plurality of different configurations; and
wherein the top surface of the pedestal base has a plurality of holes for mounting the utility adapter and the bracket.

8. The pedestal enclosure assembly of claim 7, wherein the top surface, first tier, second tier and lower ledge of the pedestal base have a central opening.

9. The pedestal enclosure assembly of claim 8, wherein the plurality of holes for mounting the utility adapter and the bracket are positioned around the central opening.

10. The pedestal enclosure assembly of claim 7, wherein the utility adapter comprises a patch panel.

11. The pedestal enclosure assembly of claim 7, wherein the bracket comprises a U-shaped bracket.

12. The pedestal enclosure assembly of claim 7, further comprising a pedestal cover removably attachable to the pedestal base.

13. The pedestal enclosure assembly of claim 12, wherein the pedestal cover is removably attachable to the pedestal base in a plurality of configurations.

14. A pedestal enclosure base comprising:
a top surface;
a first tier for receiving a first sized pedestal cover;
a second tier for receiving a second sized pedestal cover;
a lower ledge that can rest on a utility box cover; and
wherein the top surface of the base has a plurality of holes for mounting a utility adapter and a bracket.

15. The pedestal enclosure base of claim 14, wherein the top surface, first tier, second tier and lower ledge of the pedestal enclosure base have a central opening.

16. The pedestal enclosure base of claim 15, wherein the plurality of holes are positioned around the central opening.

17. A utility enclosure assembly comprising:
a utility box having a utility cover, wherein the utility cover has a cutout;
a multi-tiered pedestal base attachable to the utility cover and having a central opening such that when the multi-tiered pedestal base is attached to the utility cover the central opening aligns with the cutout, wherein the multi-tiered pedestal base is configured to receive a plurality of pedestal covers, and wherein each of the tiers is configured to receive a different size cover.

18. The utility enclosure assembly of claim 17, wherein the multi-tiered pedestal base further comprises a utility adapter attachable to an upper surface of the uppermost tier in a plurality of different configurations.

19. The utility enclosure assembly of claim 18, wherein the multi-tiered pedestal base is substantially square and the plurality of different configurations comprises four different configurations.

20. The utility enclosure assembly of claim 18, wherein the utility adapter comprises a patch panel.

21. The utility enclosure assembly of claim 17, wherein the multi-tiered pedestal base comprises a first tier and a second tier, and wherein each tier is configured to receive one of a plurality of different sized pedestal covers.

22. The utility enclosure assembly of claim 17, wherein the multi-tiered pedestal base further comprises a bracket removably attachable to an upper surface of the uppermost tier, and wherein pedestal cover is attachable to the multi-tiered pedestal base by removably attaching the pedestal cover to the bracket.

23. The utility enclosure assembly of claim 22, wherein the bracket is attachable to the upper surface of the uppermost tier in a plurality of different configurations.

24. The utility enclosure assembly of claim 22, wherein the bracket comprises a U-shaped bracket.

\* \* \* \* \*